US011114737B2

(12) United States Patent
Alvarez et al.

(10) Patent No.: US 11,114,737 B2
(45) Date of Patent: Sep. 7, 2021

(54) SIMPLIFICATION OF COMPLEX WAVEGUIDE NETWORKS

(71) Applicant: The Boeing Company, Chicago, IL (US)

(72) Inventors: Daniel A. Alvarez, Del Aire, CA (US); Jeffrey C. Gale, Los Angeles, CA (US); Bryce Hutchinson, Torrance, CA (US); Lucas Gordon Michals, Hermosa Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 18 days.

(21) Appl. No.: 16/559,223

(22) Filed: Sep. 3, 2019

(65) Prior Publication Data

US 2020/0076044 A1 Mar. 5, 2020

Related U.S. Application Data

(63) Continuation of application No. 15/285,171, filed on Oct. 4, 2016, now Pat. No. 10,403,956.

(51) Int. Cl.
*H01P 5/18* (2006.01)
*H01P 1/02* (2006.01)
*H01P 5/02* (2006.01)
*H01P 5/12* (2006.01)
*B33Y 80/00* (2015.01)
*H01P 11/00* (2006.01)

(52) U.S. Cl.
CPC .............. *H01P 5/182* (2013.01); *B33Y 80/00* (2014.12); *H01P 1/022* (2013.01); *H01P 5/02* (2013.01); *H01P 5/12* (2013.01); *H01P 11/002* (2013.01)

(58) Field of Classification Search
CPC .. H01P 5/182; H01P 1/022; H01P 5/02; H01P 5/12; H01P 11/002; B33Y 80/00
USPC ....................................................... 333/137
See application file for complete search history.

(56) References Cited

U.S. PATENT DOCUMENTS

| 7,821,355 | B2 | 10/2010 | Engel |
| 8,872,333 | B2 | 10/2014 | Lopez et al. |
| 9,184,482 | B2 * | 11/2015 | Runyon ............ H01Q 21/0037 |
| 9,306,254 | B1 | 4/2016 | Hovey et al. |
| 2010/0289602 | A1 | 11/2010 | Ligander et al. |

(Continued)

FOREIGN PATENT DOCUMENTS

| CN | 105140610 | 12/2015 | |
| EP | 3062384 A1 * | 8/2016 | ................ H01P 5/12 |

(Continued)

OTHER PUBLICATIONS

"Satellite Communications Payload and System" by Braun, T.M., 2012 John Wiley & Sons, Inc. (Year: 2012).*

(Continued)

*Primary Examiner* — Benny T Lee
*Assistant Examiner* — Hafizur Rahman
(74) *Attorney, Agent, or Firm* — Gates & Cooper LLP

(57) ABSTRACT

An improved system for simplifying a complex waveguide network in a satellite system is described herein. A waveguide network device may be configured with at least two housing portions attached together. This enables the waveguide network device to receive an arbitrary number of waveguide routes and output the routes in any configuration, effectively simplifying the overall waveguide network architecture.

20 Claims, 25 Drawing Sheets

(56) References Cited

U.S. PATENT DOCUMENTS

2010/0321136 A1    12/2010   Ligander et al.
2015/0180111 A1    6/2015   Runyon et al.

FOREIGN PATENT DOCUMENTS

JP      562203401    9/1987
JP      2010199992    9/2010

OTHER PUBLICATIONS

"When is 3D Printing the best solution for production?", by Felix Nadin, posted on Innovation and business Strategy on May 25, 2016 (Year: 2016).*

European Examination Report dated Feb. 26, 2018 for European Application No. 17190300.8.

Huang, G-L, et al., "A Compact Wideband 16-Way Power Combiner Implemented via 3-D Metal Printing", IEEE 5th Asia-Pacific Conference on Antennas and Propagation (APCAP), 2016, pp. 51-52.

McKerricher, G., et al., "Lightweight 3D Printed Microwave Waveguides and Waveguide Slot Antenna", IEEE International Symposium on Antennas and Propagation & USNC/URSI National Radio Science Meeting, Jul. 2015, pp. 1322-1323.

Henke, D., et al., "Design of a 70-116 GHz W-Band Turnstile OMT", Proceedings of the 44th European Microwave Conference, Oct. 6-9, 2014, pp. 456-459.

https://www.merriam-webster.com/dictionary/sheet, Dec. 1998.

European Examination Report dated Feb. 18, 2019 for European Application No. 17190300.8.

Koenen, C., et al., "A Configurable Coupling Structure for Broadband Millimeter-Wave Split-Block Networks", IEEE Transactions on Microwave Theory and Techniques, Dec. 2015, pp. 3954-3961, vol. 63, No. 12.

Cai, J., et al., "A design of multiport waveguide power combiner", 2008 9th International Conference on Solid-State and Integrated-Circuit Technology, Oct. 2008, 4 pages.

European Examination Communication dated Oct. 21, 2019 for European Patent Appln No. 17190300.8.

Chinese Office Action (with English translation) dated Jan. 4, 2021 for Chinese Patent Application No. 2017108113586.

* cited by examiner

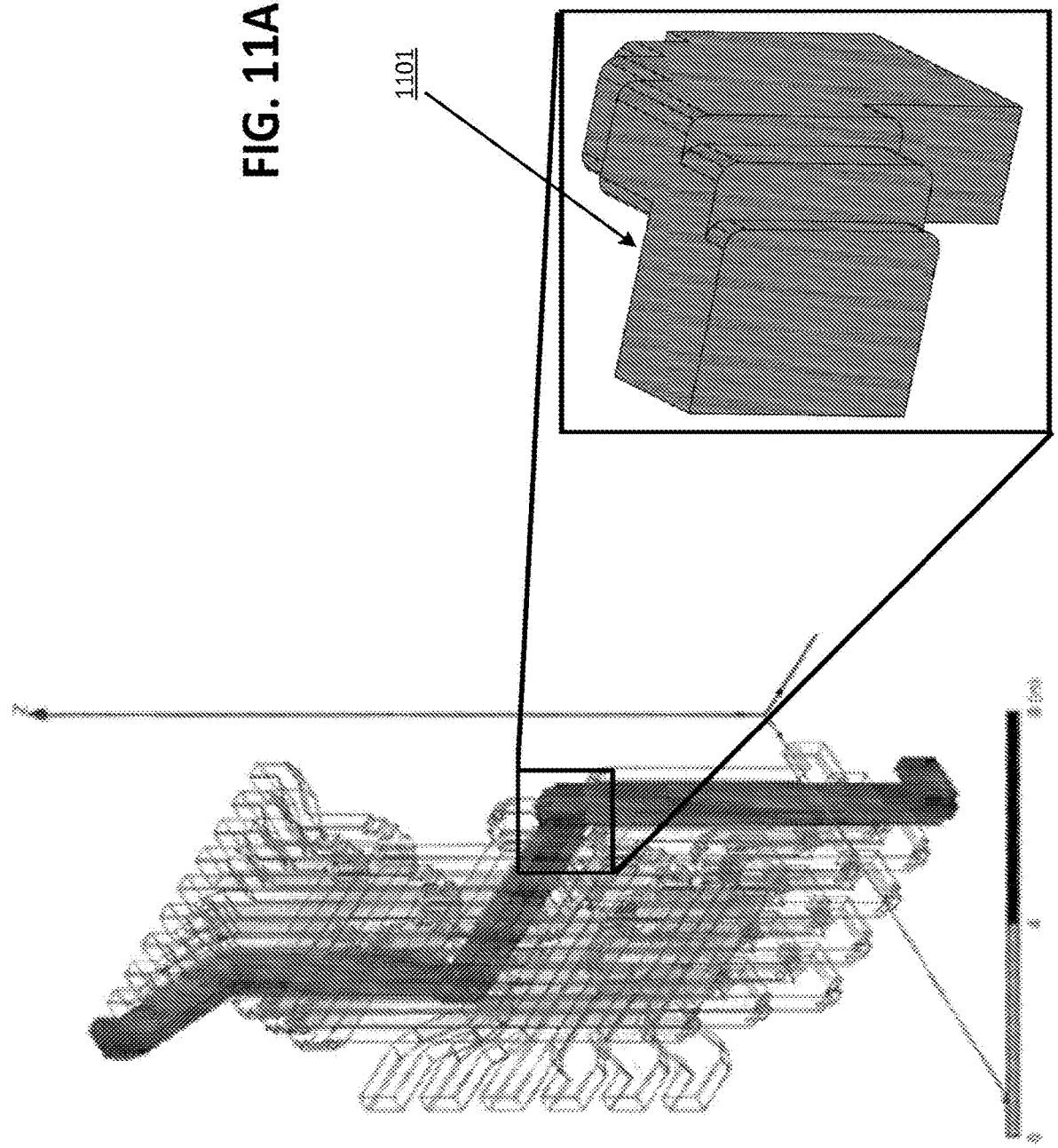

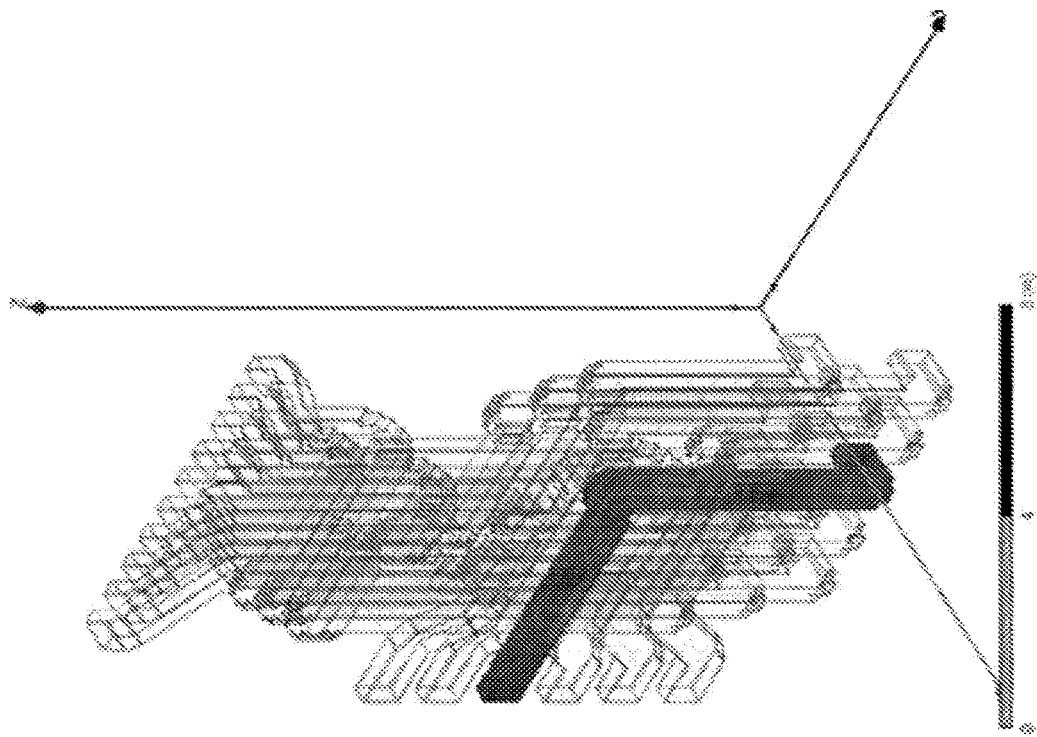

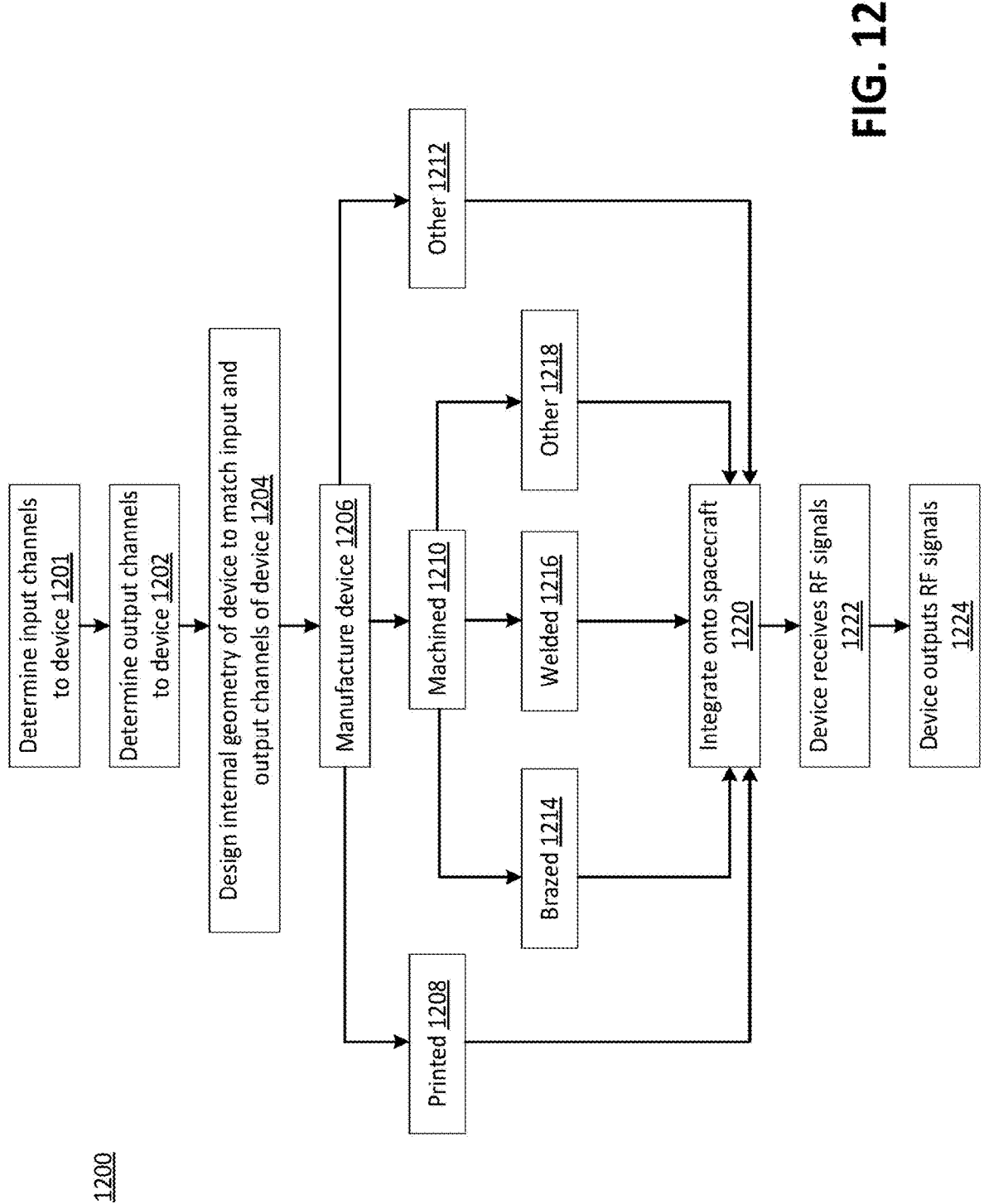

SIMPLIFICATION OF COMPLEX WAVEGUIDE NETWORKS

CROSS REFERENCE TO RELATED APPLICATIONS

This application is a continuation of U.S. patent application Ser. No. 15/285,171, entitled "SIMPLIFICATION OF COMPLEX WAVEGUIDE NETWORKS," by Daniel A. Alvarez, Jeffrey C. Gale, Bryce Hutchinson, and Lucas Gordon Michals, filed Oct. 4, 2016, and issued Sep. 3, 2019 as U.S. Pat. No. 10,403,956, which application is hereby incorporated by reference herein.

TECHNICAL FIELD

The present invention relates generally, but not exclusively, to satellite systems and designing and integrating a waveguide network in a satellite system for simplifying complex waveguide networks, and more particularly to a device configured to enable waveguide routes to be redirected to specific or predetermined output ports.

BACKGROUND

Designing and integrating waveguide networks has historically been a challenging mechanical problem. This is primarily due to the fact that current waveguide manufacturing techniques necessitate a high number of individual components and heuristic waveguide routing methods.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The illustrative examples described below provide an improved design to satellite systems by employing a single component or device (e.g. "waveguide network device") that accepts waveguide routes as an input, and then outputs the same routes in any desired configuration (e.g., "detangling" the routes). The waveguide network device may also be referred to as a "waveguide detangler." This device effectively simplifies complex waveguide networks, making them more flexible and the associated engineering more affordable. The waveguide network device can have any number of housings and is capable of inputting or outputting the signals in any of those housings. Moreover, the placement of the waveguide network device at an interface location provides the ability to break up the design of a complex waveguide network. In other words, a large satellite system becomes much more flexible. Any late changes in waveguide routing requirements can be absorbed by the waveguide network device. In other words, a design change to alter the waveguide paths would necessitate that a new waveguide network device be manufactured. Conventionally, a change like this would result in many waveguide routes be re-designed, but the invention could be used to isolate the change to only one part, i.e., the waveguide network device.

In illustrative examples of the present disclosure, a device and a method are provided for directing waveguide routes in a satellite system. According to one particular implementation, a waveguide network device comprises at least two housings attached together. A first housing includes one or more waveguide channels, each of which includes a first input port and a first output port. Similarly, a second housing includes one or more waveguide channels, each of which includes a second input port and a second output port. The second housing is configured to receive a signal from the first input port of a waveguide channel in the first housing, and redirect the signal to an output port either of the second housing or of the waveguide channel in the first housing.

According to another particular implementation, a waveguide network device comprises at least two housings attached together. The waveguide network device is configured to receive from an input port of one or more waveguide channels in one of the at least two housings, a signal. The waveguide network device is further configured to redirect the signal to a predetermined output port of one or more waveguide channels in any one of the at least two housings.

According to yet another particular implementation, a method is disclosed herein. An example of the inventive method comprises determining an output port of one or more waveguide channels in a first or second housing, and attaching the first housing to the second housing to form a single device configured to redirect signals to the determined output port of the waveguide channels in the first or second housing.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included:

FIG. 2 illustrates an overview of an example of a waveguide network device with two housings and a brazed layer in between.

FIG. 12 is a flow diagram representing the creation and utilization of a waveguide network device in a satellite system.

DETAILED DESCRIPTION OF ILLUSTRATIVE EXAMPLES

Figure 1:
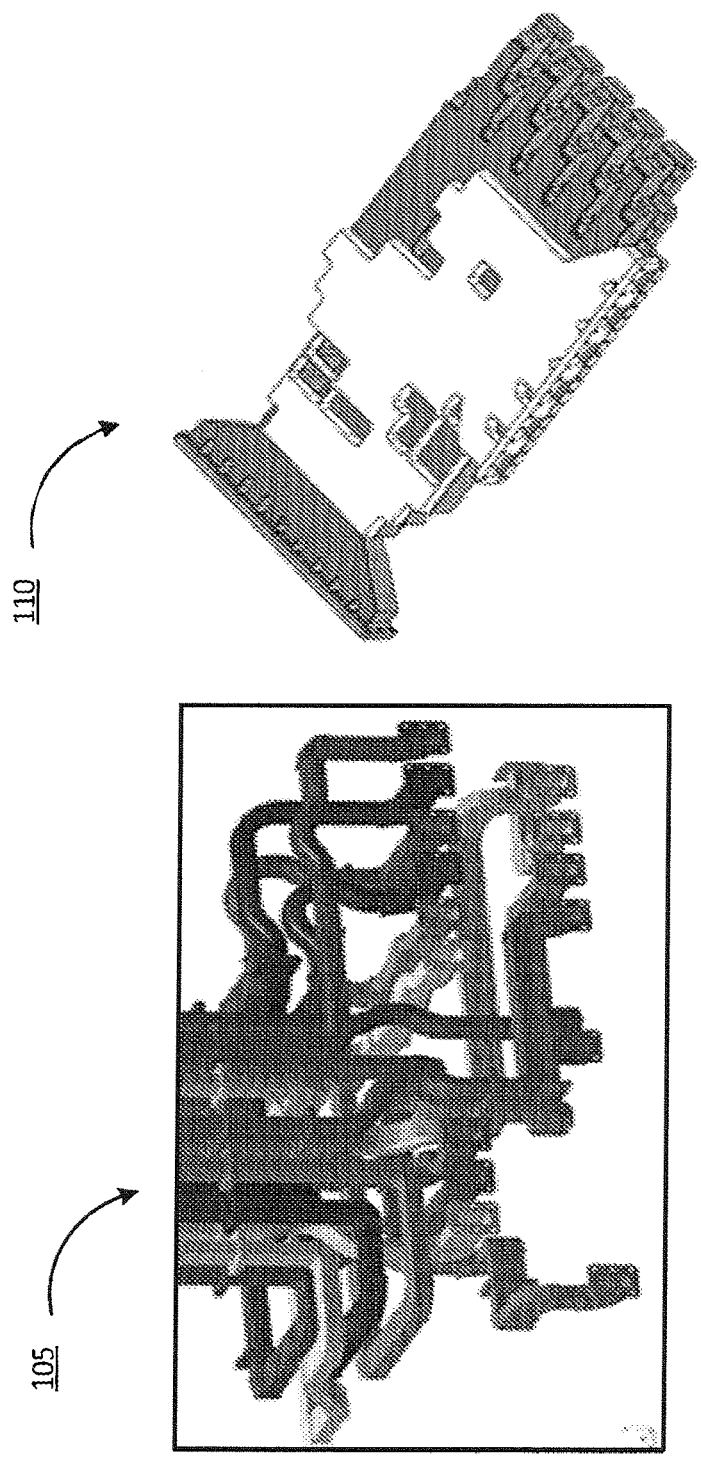
FIG. 1 illustrates a known example of a waveguide network and an alternate example of a waveguide network device in a satellite system.

In a satellite system environment, a waveguide is typically used to route signals (e.g., RF signals). This satellite system environment may, for instance, include a multi-beam satellite. Generally, the manufacturing of conventional waveguide is performed by brazing elbows and flanges to extruded pieces of aluminum. The individual pieces of conventional waveguide are then mechanically fastened together to form a waveguide network. While the manufacturing of individual conventional waveguide pieces is inexpensive, the entire waveguide network can get very expensive, inefficient, and inflexible due to the following engineering challenges:

1) Complex waveguide networks require a high number of components to ensure the waveguide correctly routes the RF signals while also maintaining structural support and integrity. Designing these networks is heuristic and labor-intensive, and also typically leads to non-optimized routes and line-lengths.
2) For waveguide networks with a high waveguide density, it is often difficult to ensure that every mechanical attachment is properly torqued and staked. These mechanical constraints make the integration of complex waveguide networks cumbersome and expensive.
3) Once complete, any change to the waveguide network almost certainly has cascading effects, potentially requiring a complete re-design. This makes the larger system inflexible to late changes in requirements.
4) Often, waveguide networks become so large that they must be divided between differing subsystem groups, which then route to a common interface location. On a satellite, for example, the antenna group and payload layout group both route waveguide to the antenna-payload interface. Ensuring that all the routes correctly align at this location has been shown to be an iterative and labor-intensive process.
5) In order to process large amounts of data, high throughput multi-spot beam payloads are becoming the standard in the commercial satellite industry and these multi-spot beam payloads inherently have very complex waveguide networks.

Thus, a waveguide network device with at least two housings configured to receive a signal from one of the at least two housings, redirect the signal, and output the signal to a predetermined or specific output port in either the same housing the signal was received from or to an output port in a different housing may be advantageous. That is, the technical solution described herein is an example of a waveguide network device that significantly reduces the number of required mechanical attachments or parts but contains some functionality that redirects or reroutes signal paths is beneficial to any communication system containing a waveguide network.

Unlike conventional waveguide that is comprised of individual pieces of extruded aluminum, a waveguide network device is comprised of numerous waveguide channels in a single part. Specifically, the waveguide network device may comprise of at least two or more housings brazed together. This enables waveguide routes or signals to compactly "jump" from one waveguide channel to another, and effectively gives the waveguide network device the flexibility for any input port to be routed to any desired output port.

The various examples used in this disclosure are in the context of the design and development of satellite systems, but it should be understood that the described principles may be applied to other developmental scenarios involving satellite systems in a communication network.

FIG. 1 illustrates two types of waveguide network solutions for a satellite system. Waveguide network 105 is known in the art. That is, waveguide network 105 is generally known to those in the art as a portion of a waveguide network with conventional waveguides that are comprised of extruded aluminum. However, waveguide network device 110, as shown in FIG. 1 and as will be described further in detail in the present disclosure, is a simplified version of the waveguide network 105. This waveguide network device 110 in conjunction with certain engineering design aspects may simplify signal navigation in a satellite system.

An example of a device in accordance with the present invention is a waveguide network device 110 that accepts radio-frequency (RF) signals as an input, and then outputs the same routes in any desired configuration. The waveguide network device 110 is comprised of at least two housing portions configured to attach to one another. The individual housings are attached using vacuum brazing. However, as known to those skilled in the art there exists other possible ways to attach housing portions together.

Figure 2:
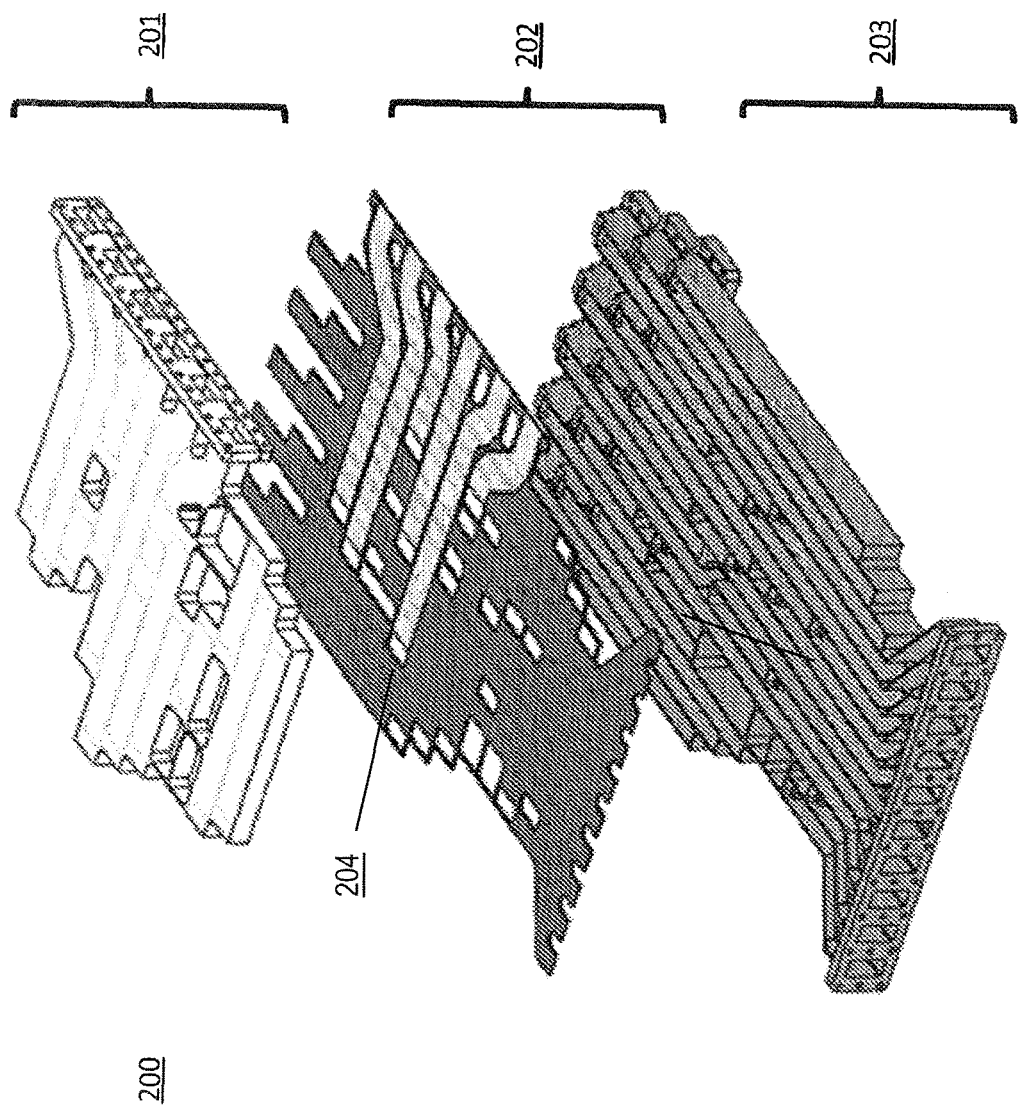

FIG. 2 shows an example of a 16-channel waveguide network device 200 with two housing portions configured to be attached together. The number of waveguide channels chosen for the device 200 is non-limiting; therefore, any possible number of waveguide channels may be configured. Thus, the number of channel waveguides may, for instance, consist of: 10, 50, 100 or more channels. Moreover and as described in further detail with respect to FIG. 3, the number of housings for device 200 may also be configured with more than just two housing portions attached together.

Here in FIG. 2, the device 200 is comprised of at least a first housing 203 and a second housing 201. The first housing 203 includes one or more waveguide channels. Each of the waveguide channels further includes an input port and an output port. As shown in FIG. 2, the second housing 201 is configured to attach to the first housing 203 with a braze sheet 202 having apertures 204 in between. In one example, this second housing 201 is configured to receive one or more signals from the input ports of the first housing 203 and redirect the one or more signals to a specific or predetermined output port of the first housing 203 or of the second housing 201. The second housing 201 is preconfigured or manufactured with a design directed to simplify a certain type of satellite system (e.g., IntelSat-33, ViaSat-2, or InmarSat F4). Simply put, the second housing 201 is configured to receive an input signal and redirect the signal to a desired output port of one of the waveguide channels located in the first housing 203 or second housing 201.

Similar to the configuration of the first housing 203, the second housing 201 also includes multiple input ports and output ports. In one alternate example, the second housing 201 includes less waveguide channels. In other words, the second housing 201 has a number of waveguide channels that is less than the number of the waveguide channels of the first housing 203. However, it is also possible that the second housing 201 includes a number of waveguide channels that is more than the number of waveguide channels of the first housing 203.

Specifically, the device 200 in FIG. 2 shows an exploded view of a waveguide network device, which may represent what the waveguide network device looks like prior to the brazing operation for this particular example. A satellite system with a waveguide network device 200 incorporated therein simplifies the overall waveguide network. Furthermore, the waveguide network device 200 can be replaced if a user or operator of the satellite system decides to alter some of the signal paths. The placement of the waveguide network device 200 at an interface location provides an ability to break up the design of a complex waveguide network. In other words, a large satellite system becomes much more flexible. Any late changes in waveguide routing requirements are completely absorbed by the waveguide network device 200.

Figure 3:
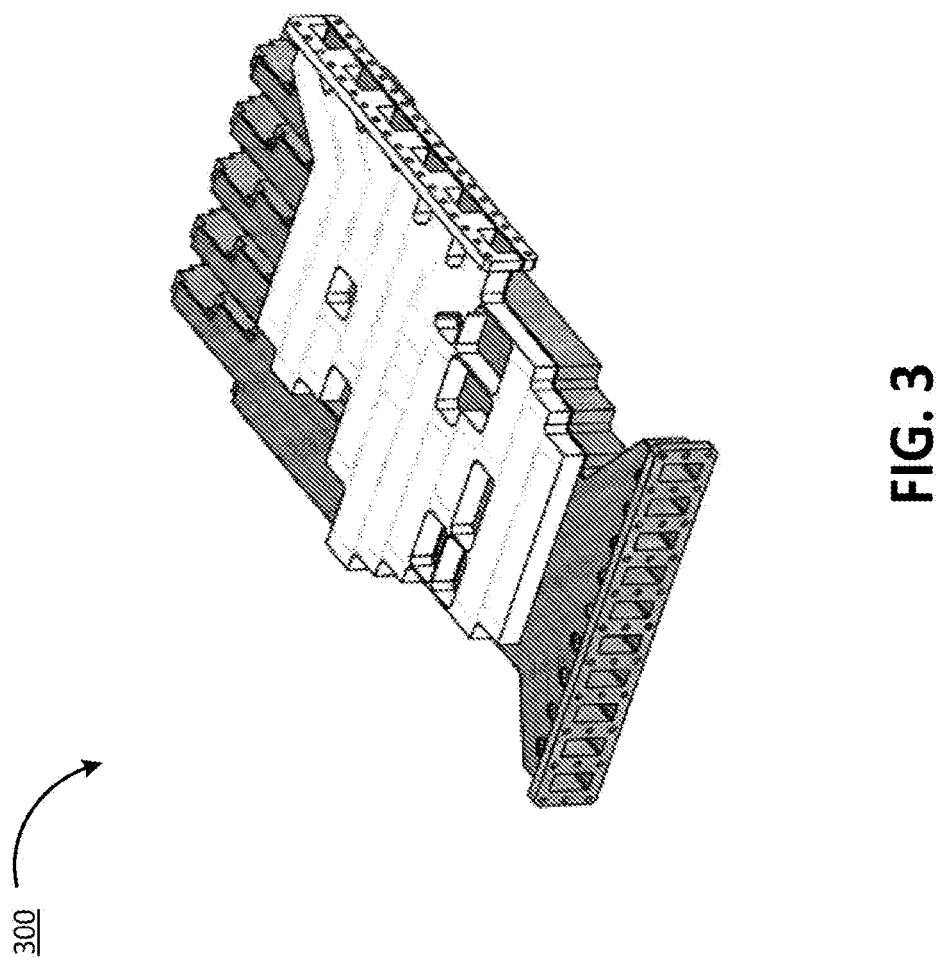
FIG. 3 depicts a perspective view of a waveguide network device.

FIG. 3 illustrates a perspective view of a waveguide network device 300. FIG. 3 depicts the waveguide network device 300 with only two housings attached together; however as analyzed above and described herein, the number of housings may vary (e.g. more than two housings). Thus, this waveguide network device 300 may comprise of a single unit or component when at least two housing portions are attached together. That is, in alternate examples, the waveguide network device 300 includes three housing portions or four housing portions attached together. In other words, the single component can include any number of housings attached together and accept an arbitrary number of waveguide routes and output those routes in any configuration so long as space permits.

Figure 4A:
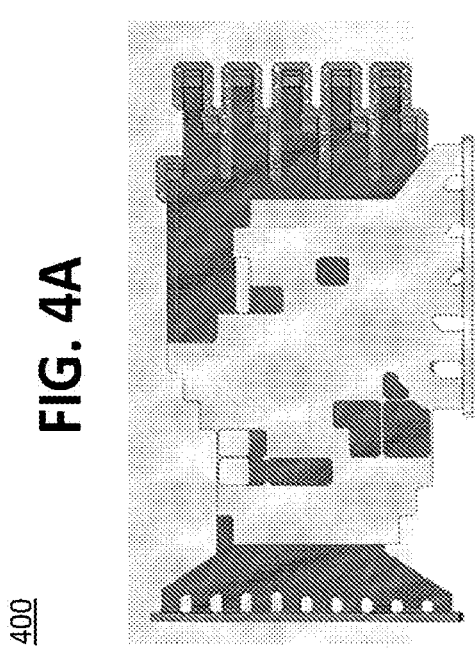
FIGS. 4A-4C depict a top view and cross-section views of the waveguide network device of FIG. 3.
Figure 4B:
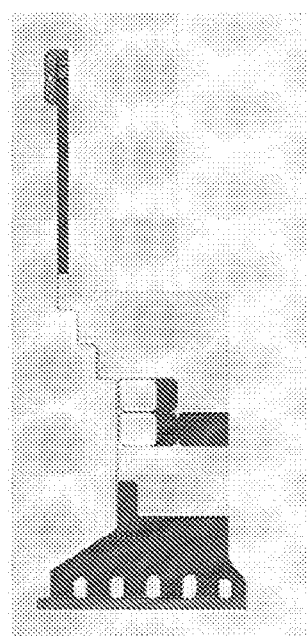
Figure 4C:
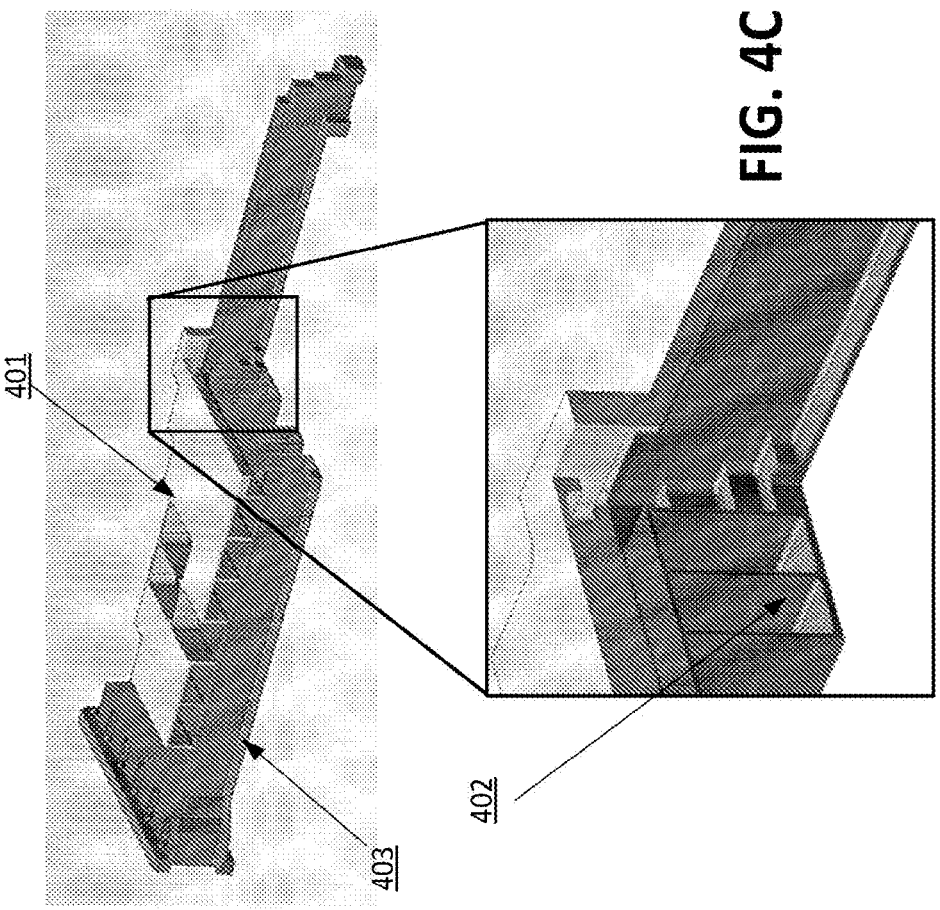

FIGS. 4A-4C depict a top view and multiple cross-sectional views of the waveguide network device 400. As shown in FIG. 4A, a top view of the waveguide network device is illustrated. In FIG. 4B, a cross-sectional view of the waveguide network device is illustrated. In FIG. 4C, a first housing 403 of the waveguide network device includes one or more waveguide channels 402. Each of the one or more waveguide channels in the first housing also includes an input and an output port. Furthermore, FIG. 4C shows a more detailed illustration of a second housing 401 that is layered or attached to the first housing 403. The second housing 401 includes one or more waveguide channels. Similar to the configuration of the first housing 403, the second housing 401 also includes multiple input and output ports. A more detailed illustration of the input and output ports for each of the housings is described below in FIG. 5.

Figure 5:
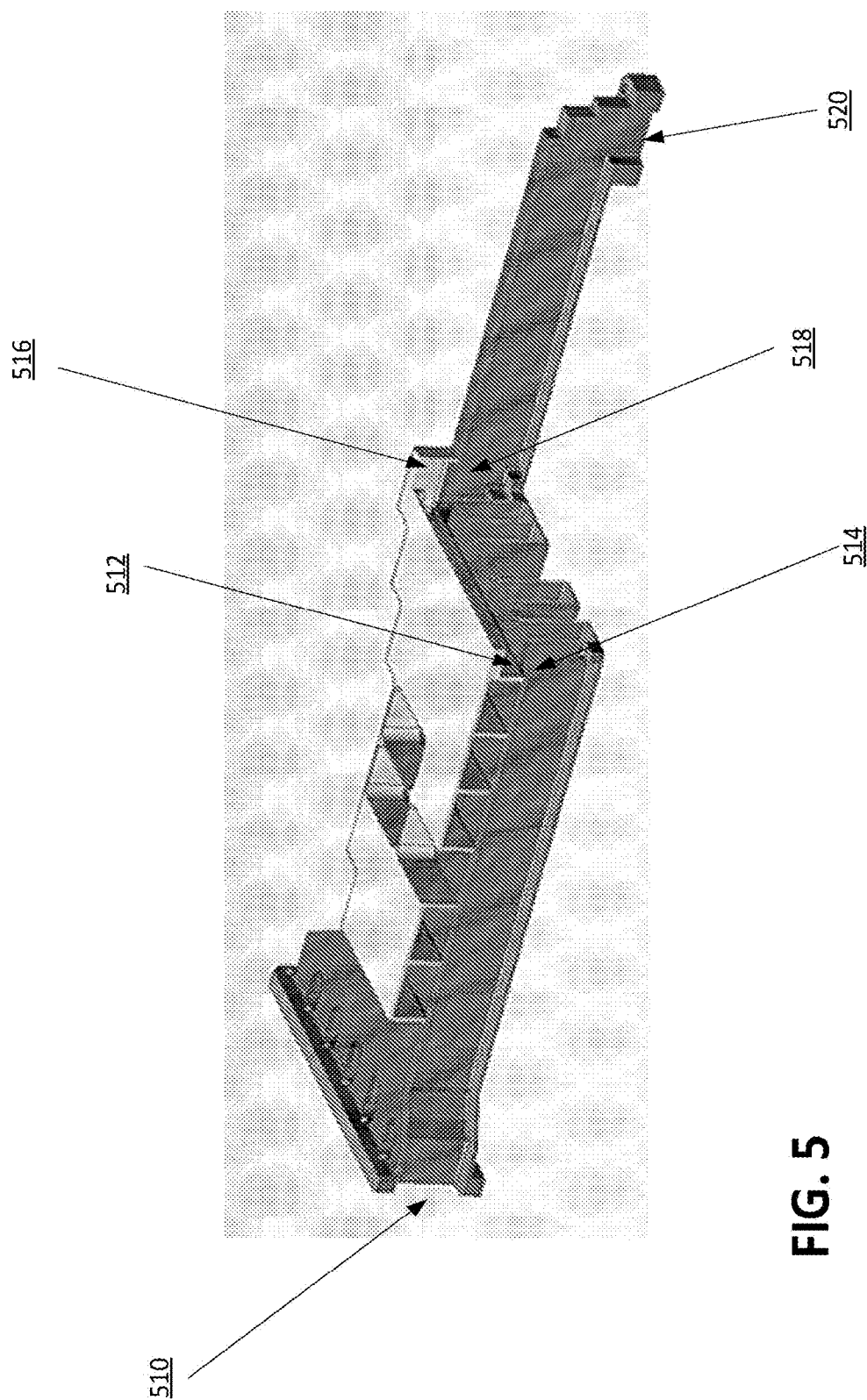
FIG. 5 illustrates a detailed cross-section view of the waveguide network device of FIG. 4C.

FIG. 5 depicts a more detailed cross-sectional view of the waveguide network device 300 described in FIGS. 3 and 4C. FIG. 5 illustrates a view where a signal may start in the first housing, jump to the second housing, and then output in one of the output ports of the first housing. As shown in FIG. 5, a first housing includes one or more waveguide channels. Each of the one or more waveguide channels in the first housing also includes an input and an output port. For instance, the waveguide network device in FIG. 5 illustrates a first input port 520 and a first output port 518 of the first housing. A second input port 514 and a second output port 510 of the first housing is also illustrated. Furthermore, FIG. 5 shows a second housing that is layered or attached to the first housing. The second housing includes one or more waveguide channels. Similar to the configuration of the first housing, the second housing also includes multiple input and output ports. That is, FIG. 5 illustrates an input port 516 and an output port 512 of the second housing.

Figure 6C:
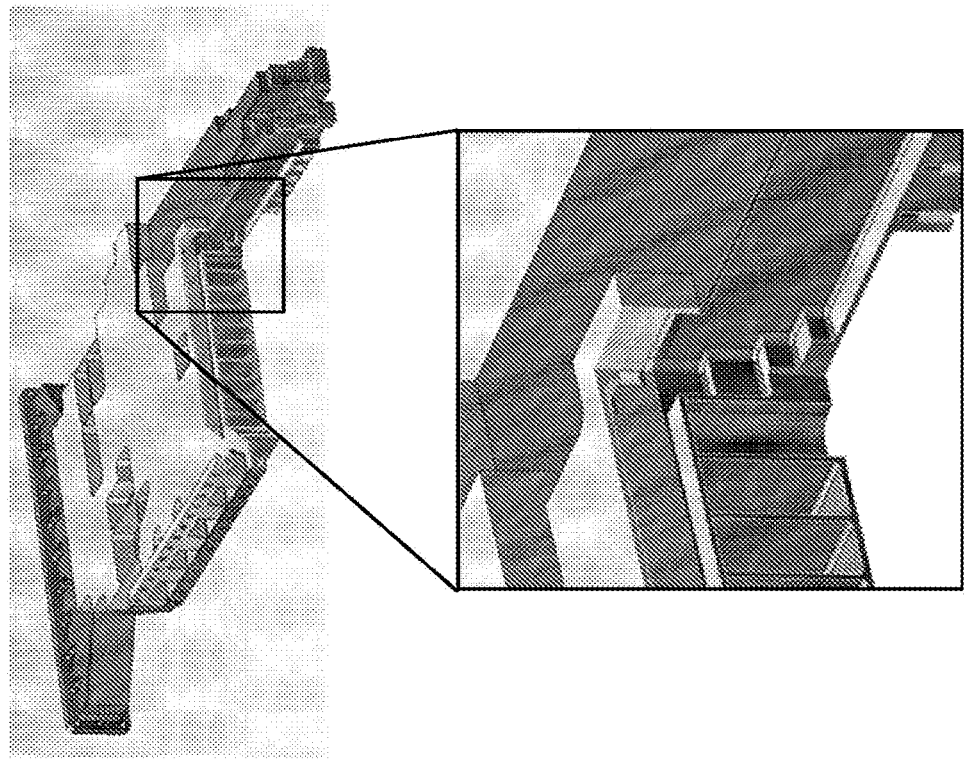
FIGS. 6A-6C depict an alternate top view and alternate cross-section views of the waveguide network device of FIG. 3.
Figure 6A:
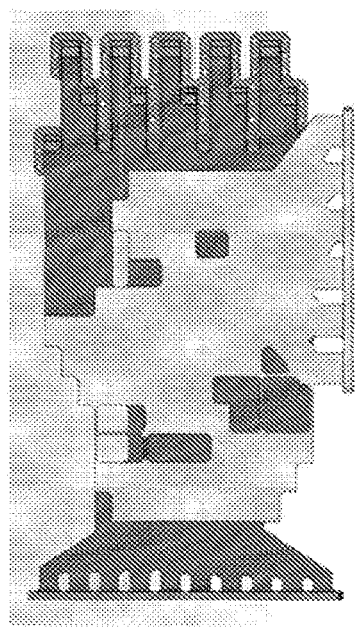
Figure 6B:
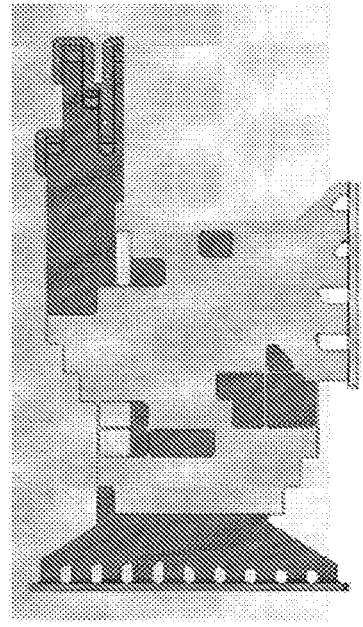
Figure 7:
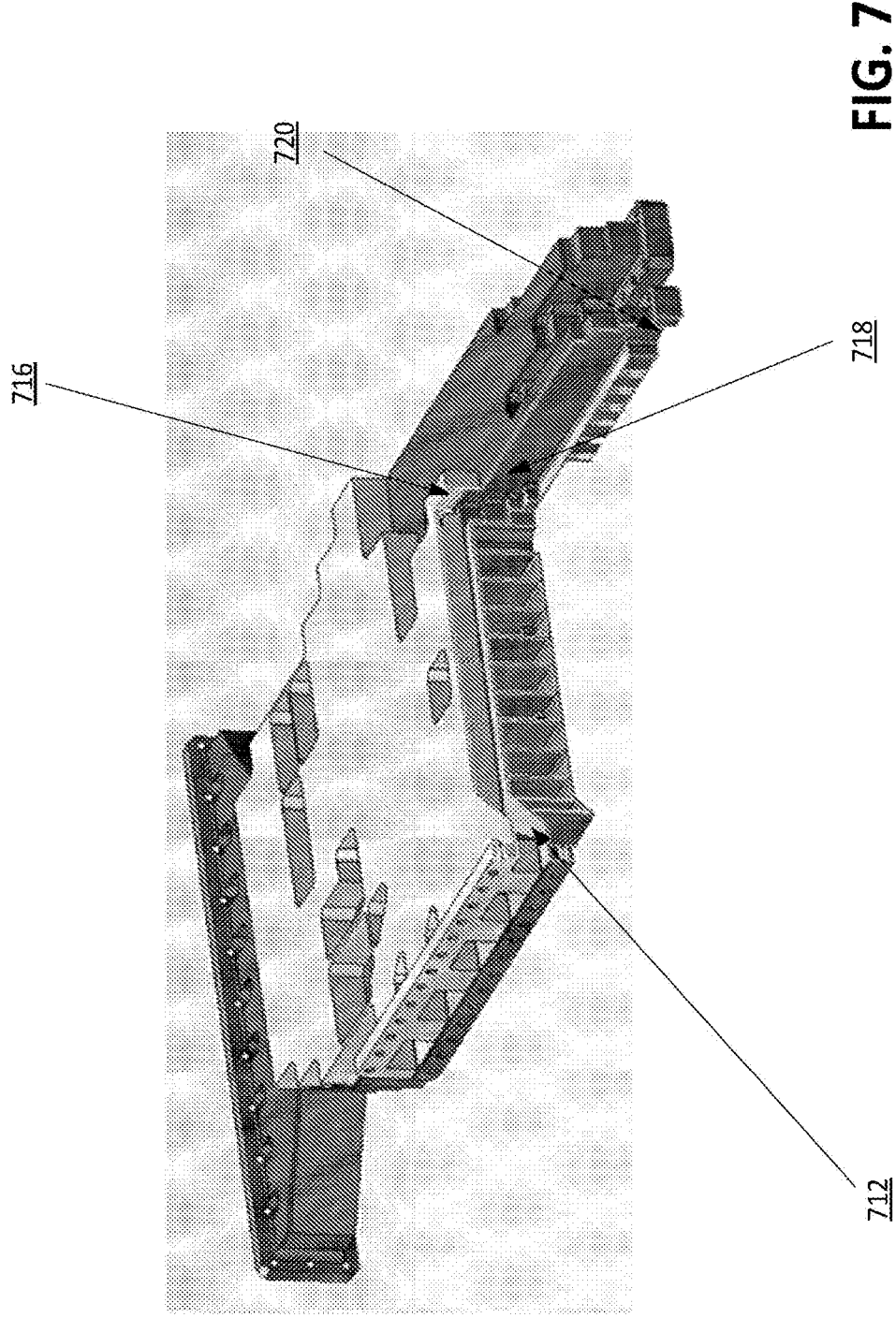
FIG. 7 depicts a detailed alternate cross-section view of the waveguide network device of FIG. 6C.

FIGS. 6A-6B illustrate top views of the waveguide network device. FIGS. 6C and 7 illustrate a more detailed cross-section view of the waveguide network device. More specifically, the waveguide network device in FIG. 7 provides a view where a signal may start in the first housing and be re-directed to an output port of the second housing. The waveguide network device in FIG. 7 is similar to that described above with respect to FIG. 5, but differs in that the cross-section is now of an RF path that outputs from the second housing as opposed to outputting from the first housing. Each of the one or more waveguide channels in the first housing also includes an input and an output port. For instance, the waveguide network device in FIG. 7 illustrates a first input port 720 and a first output port 718 of the first housing. Furthermore, FIG. 7 shows a second housing that is layered or attached to the first housing. The second housing includes one or more waveguide channels. Similar to the configuration of the first housing, the second housing also includes multiple input and output ports. That is, FIG. 7 illustrates an input port 716 and an output port 712 of the second housing.

Figure 8:
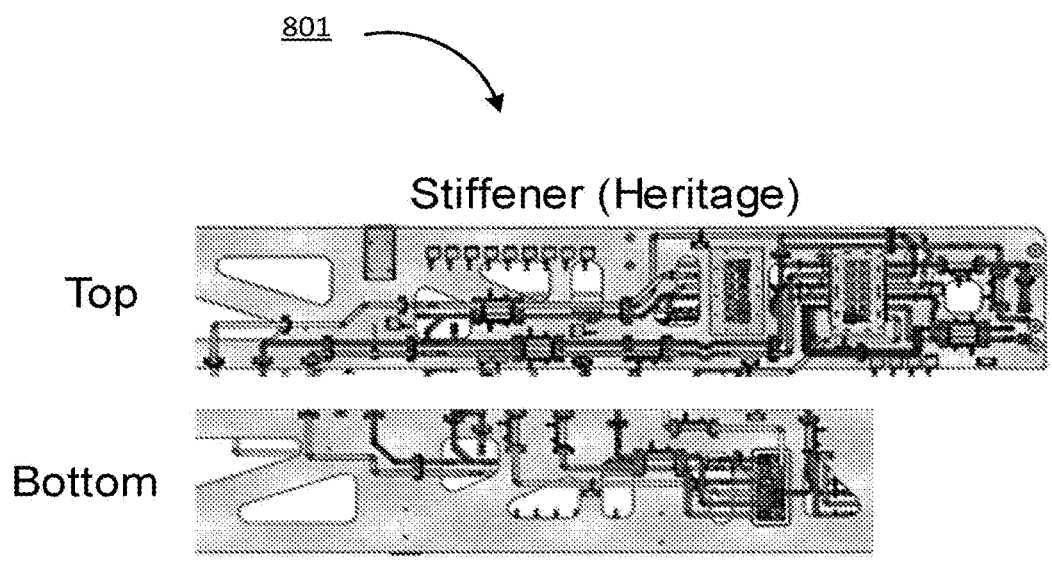
FIGS. 8-9 depict an example of a portion of a payload in a satellite system without a waveguide network device and an alternate example of a portion of a payload in a satellite system with a waveguide network device.
Figure 9:
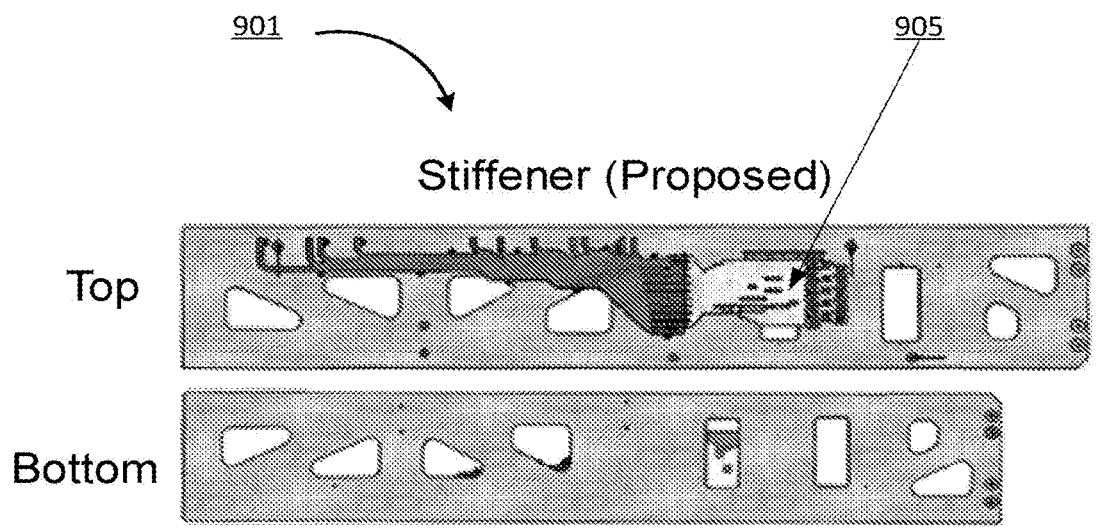

FIG. 8 depicts an example of a portion of a payload in a satellite system without a waveguide network device 801 and FIG. 9 depicts an alternate example of the portion of the payload in the satellite system with a waveguide network device 901. As shown in FIG. 9, the waveguide network is simplified with a waveguide network device 905 contained in the satellite system. Moreover, the amount of parts necessary and mechanical attachments required when a satellite system incorporates or integrates a waveguide network device is clearly less than a satellite system without a waveguide network device. Put another way, the costs and expenses associated with the design and integration can be lowered when using a waveguide network device inside of a satellite system.

Figure 10:
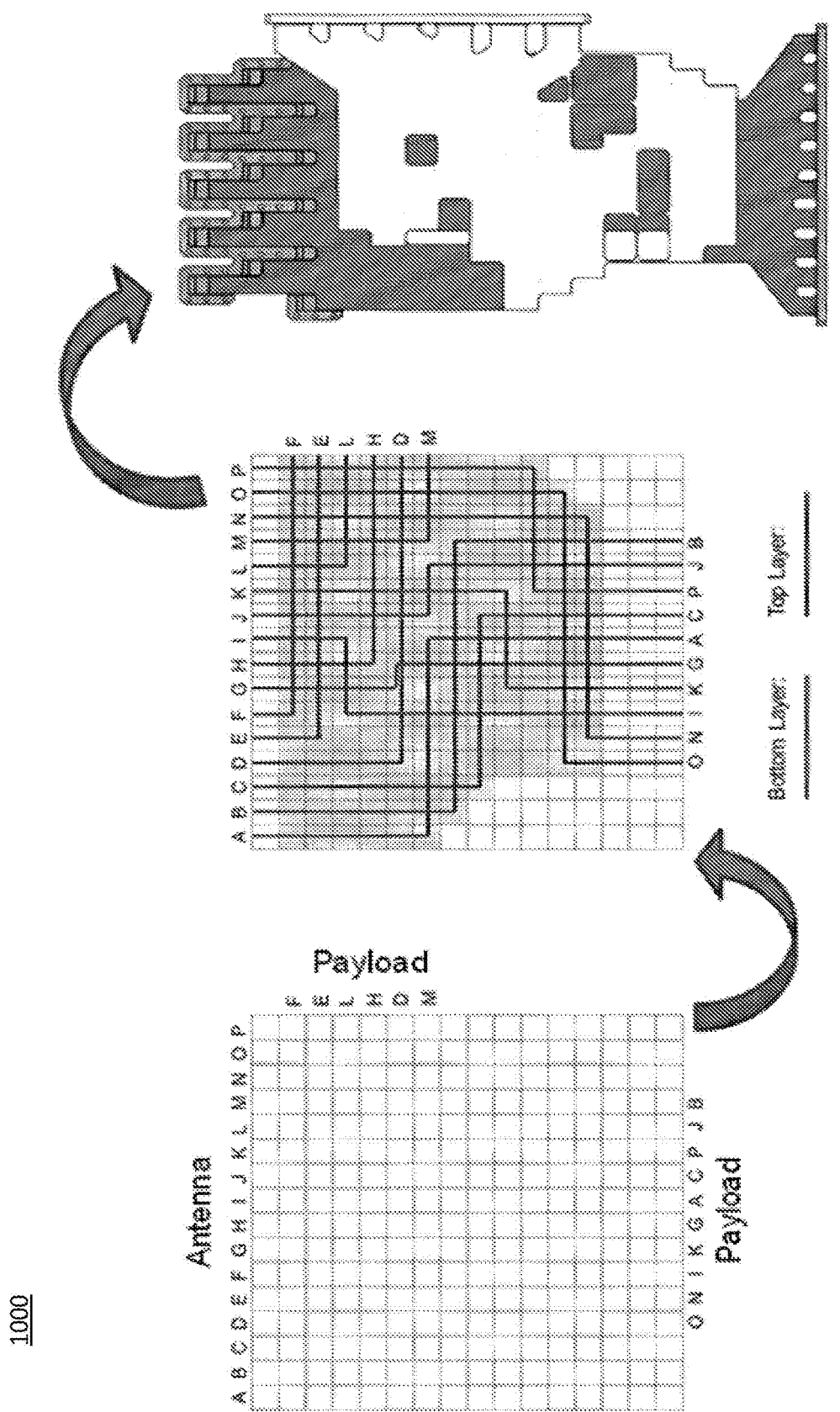
FIG. 10 illustrates an example of the design methodology to create a waveguide network device.

FIG. 10 illustrates an example of the design methodology 1000 to create a waveguide network device. As shown in FIG. 10, in one example of the design methodology, the route paths for each individual signal are predetermined and designed before the integration of the waveguide network device into the satellite system. The process includes designing or configuring the routes or route paths for each individual waveguide channel. In other words, the design or configuration of the one or more waveguide channels in a first housing and the one or more waveguide channels in a second housing are predetermined before manufacturing the waveguide network device. Once the design is determined, in one illustrative example and as further described below with respect to FIG. 13, the design may be transferred to a separate computing device. The computing device may then utilize the design to direct a printer, a three-dimensional (3-D) printer, or some sort of manufacturing device to manufacture the waveguide network device.

Figure 11B:
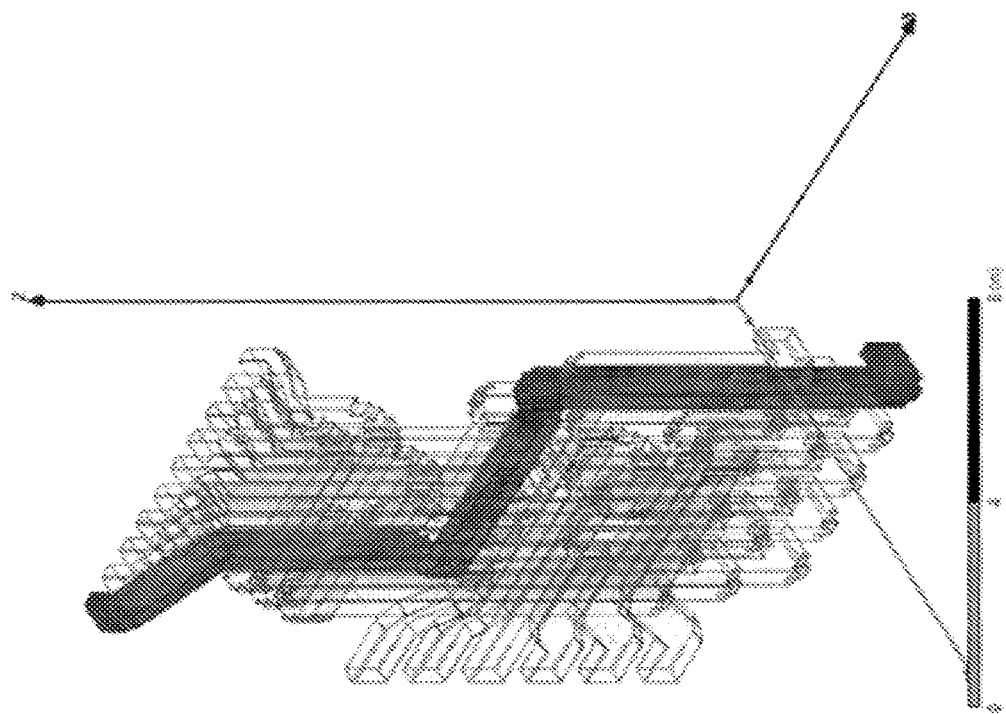
FIGS. 11A-11N depict examples of individual RF paths of the waveguide network device depicted in FIG. 3.
Figure 11C:
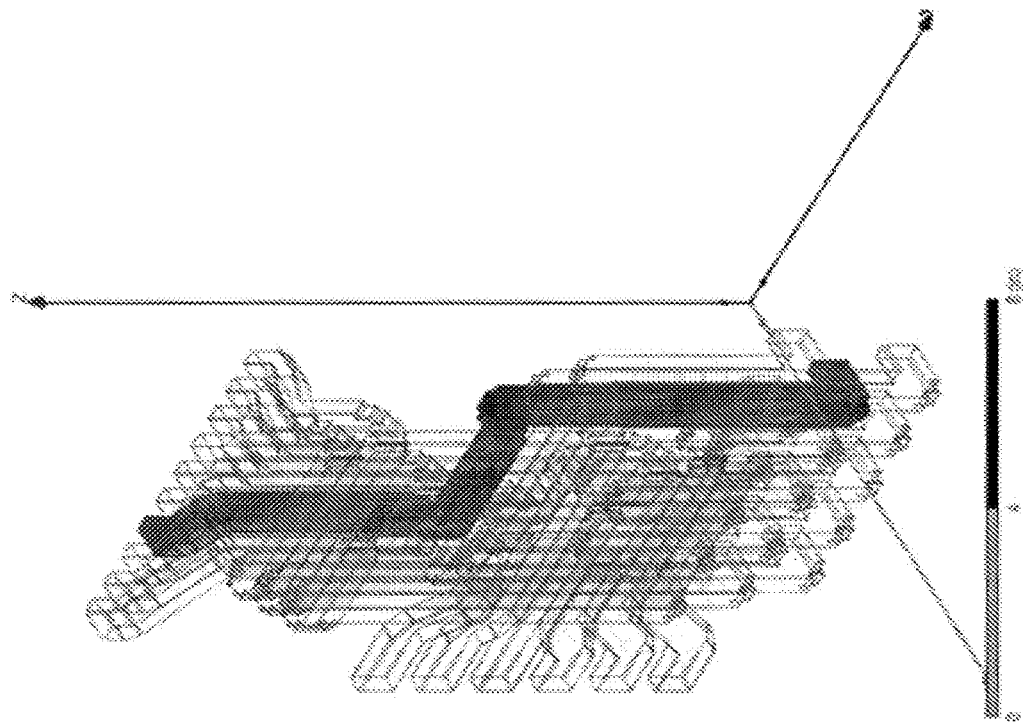
Figure 11D:
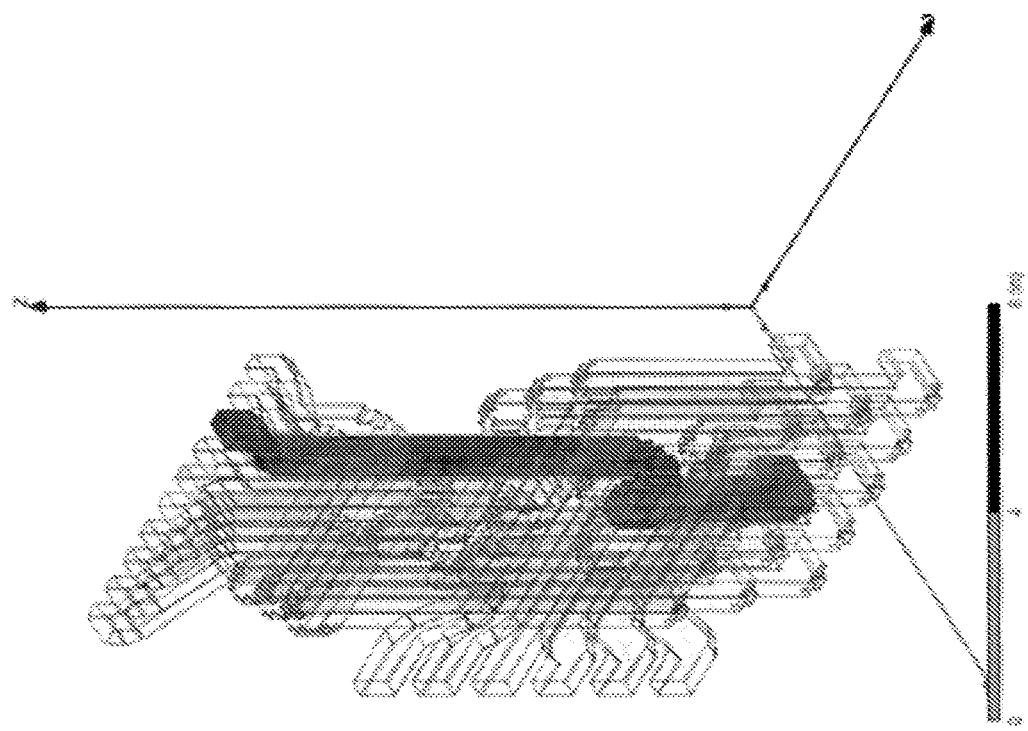
Figure 11E:
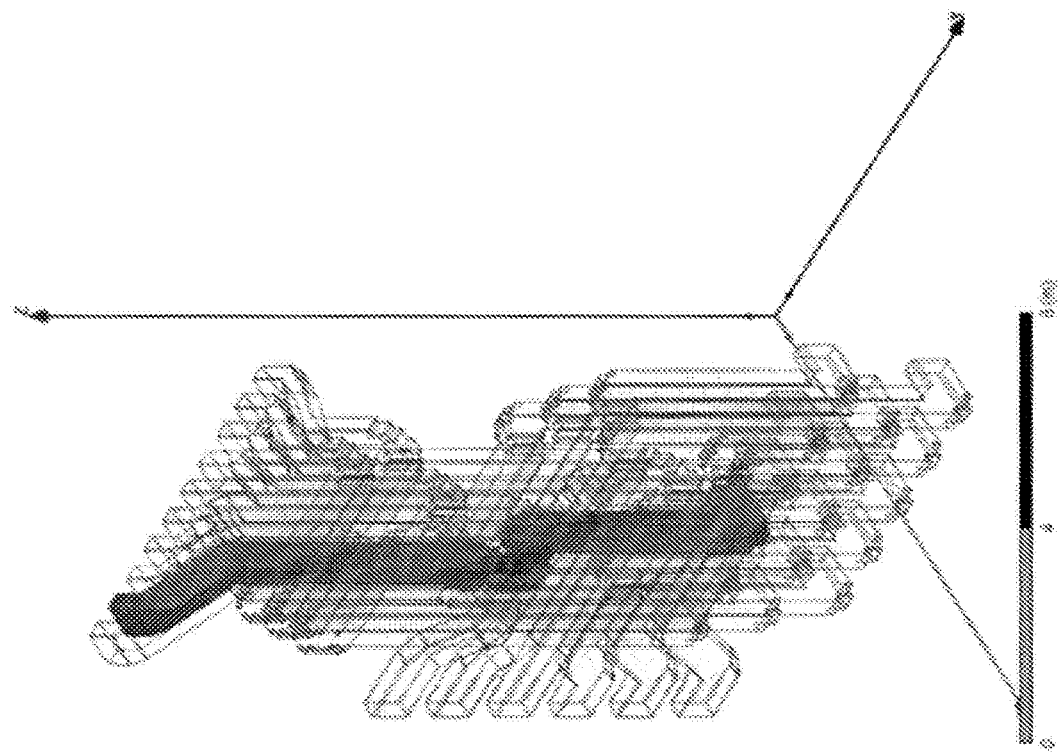
Figure 11F:
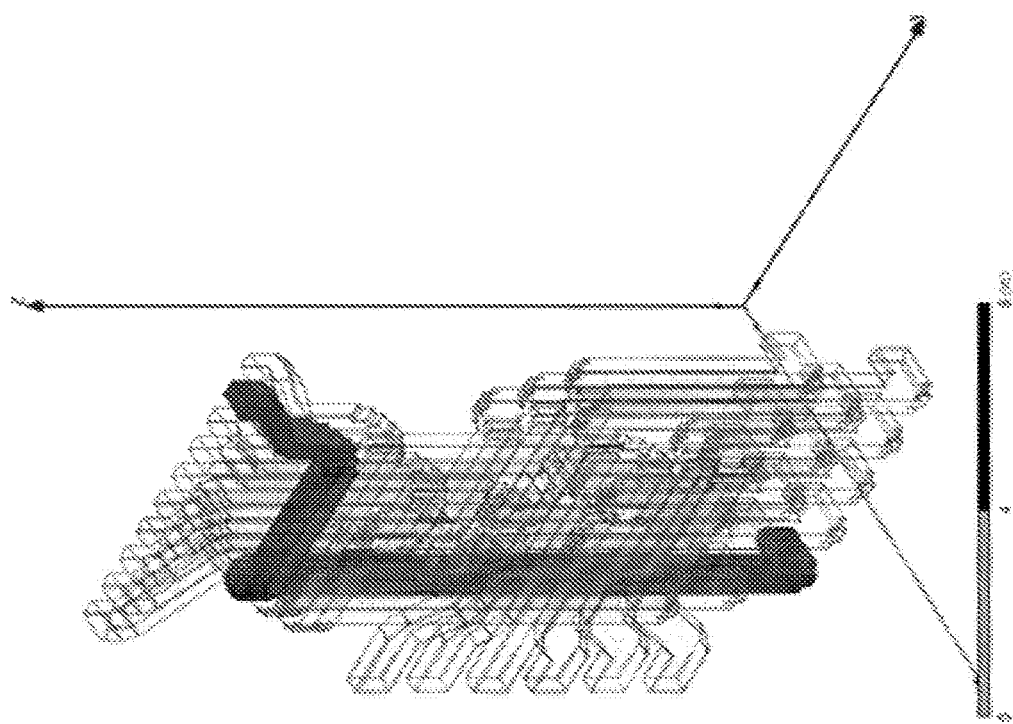
Figure 11G:
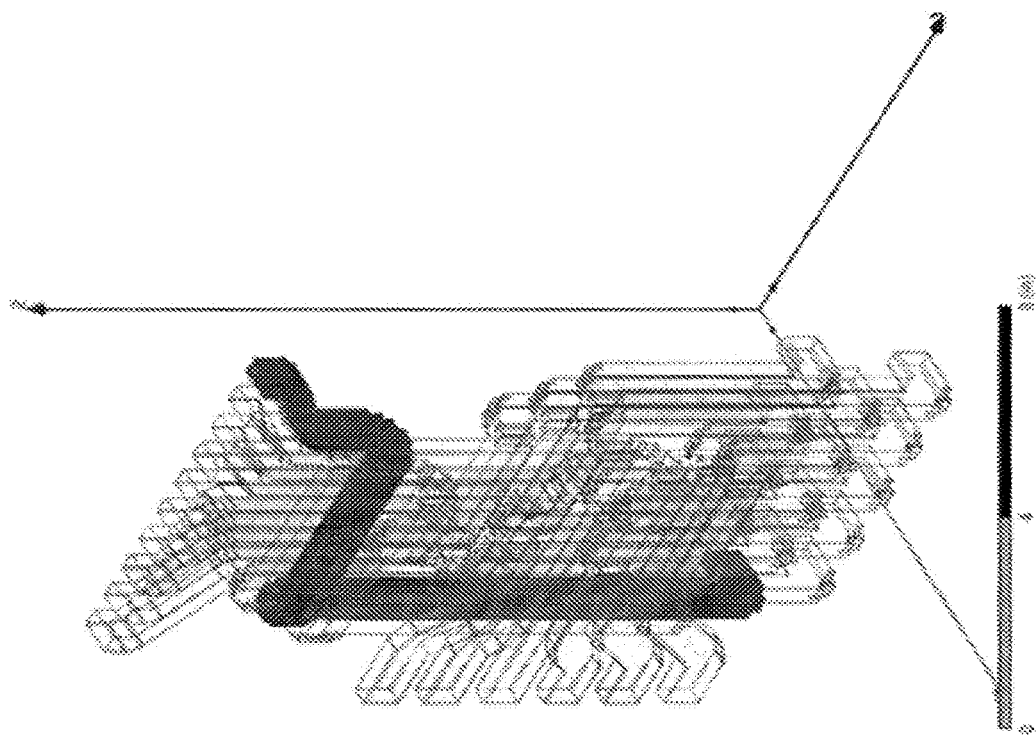
Figure 11H:
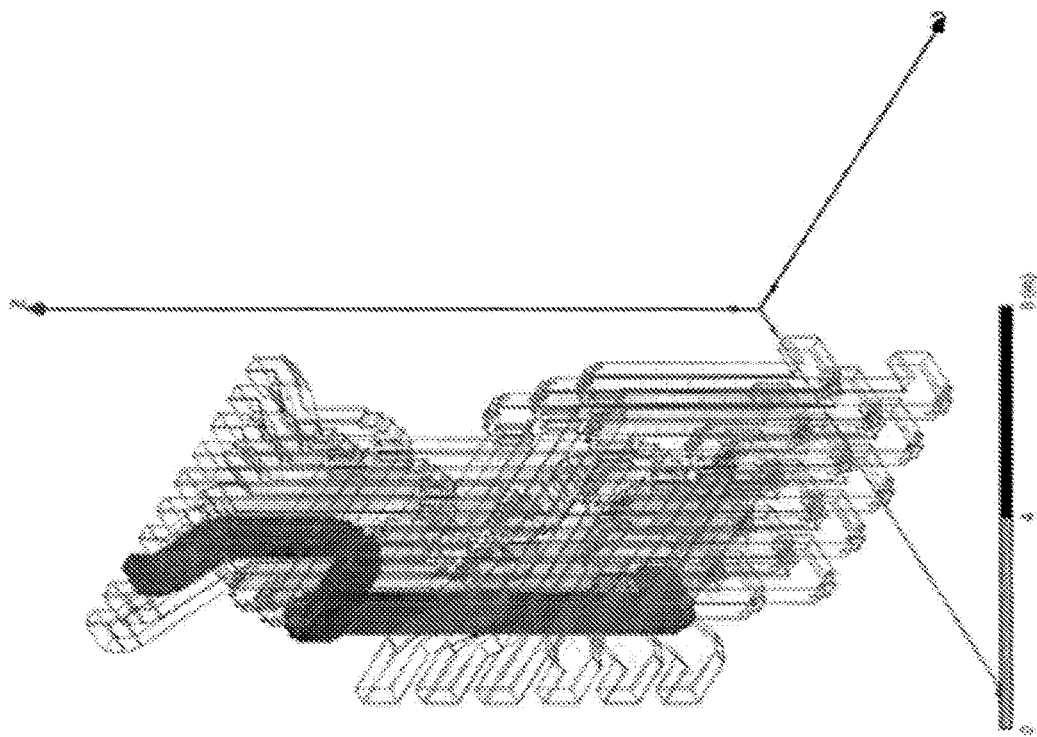
Figure 11I:
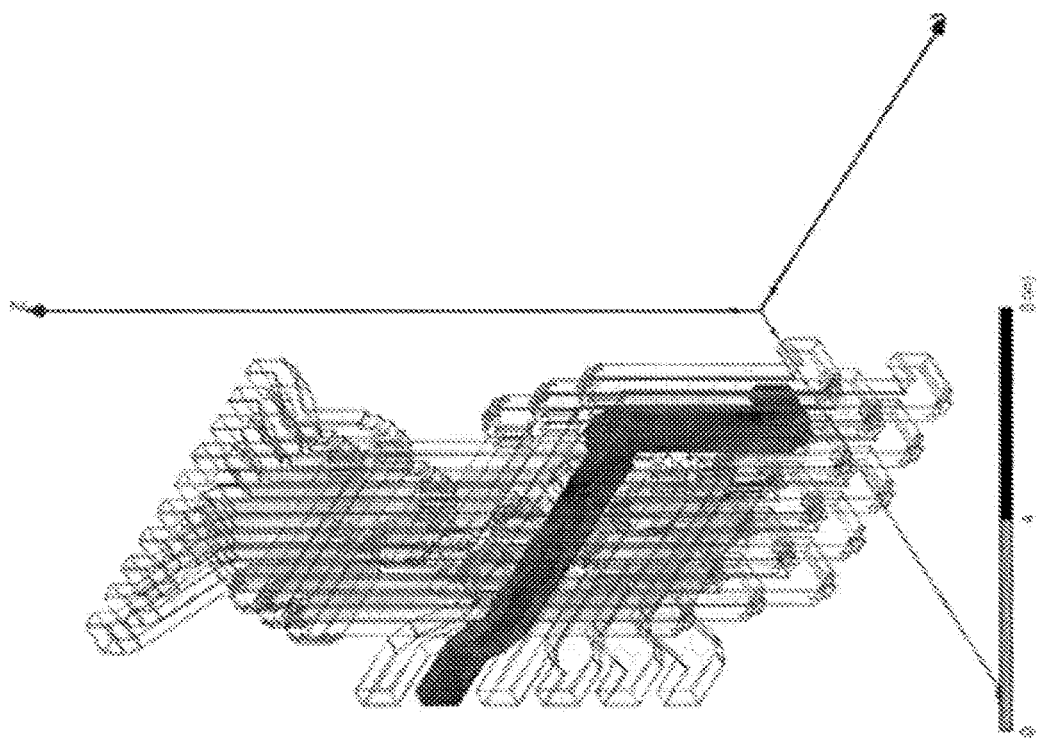
Figure 11J:
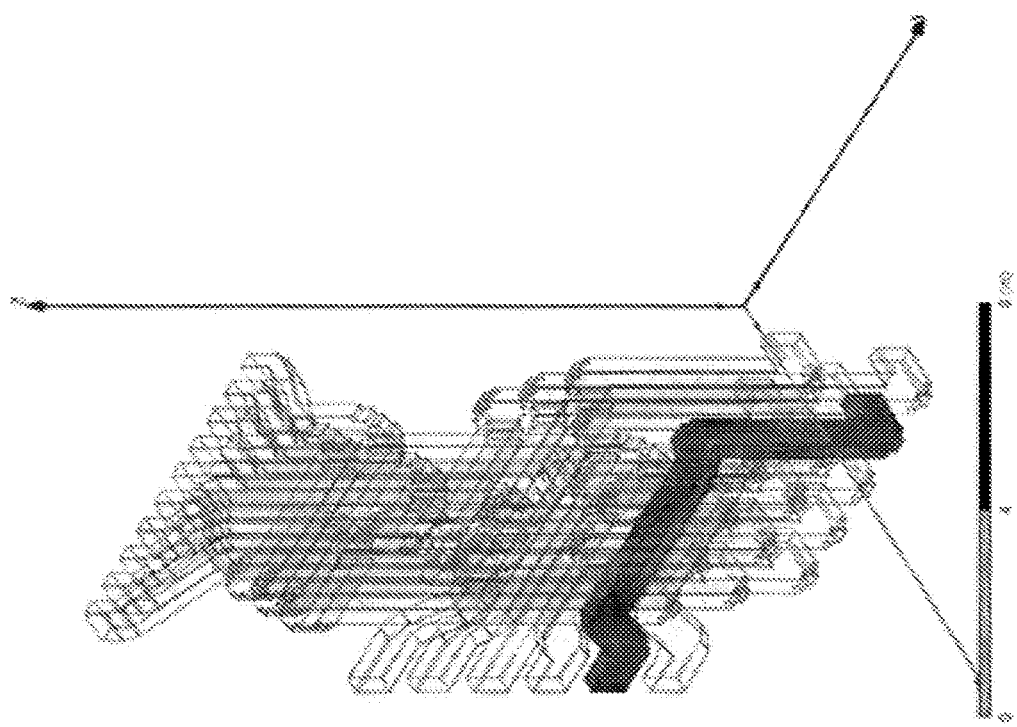
Figure 11K:
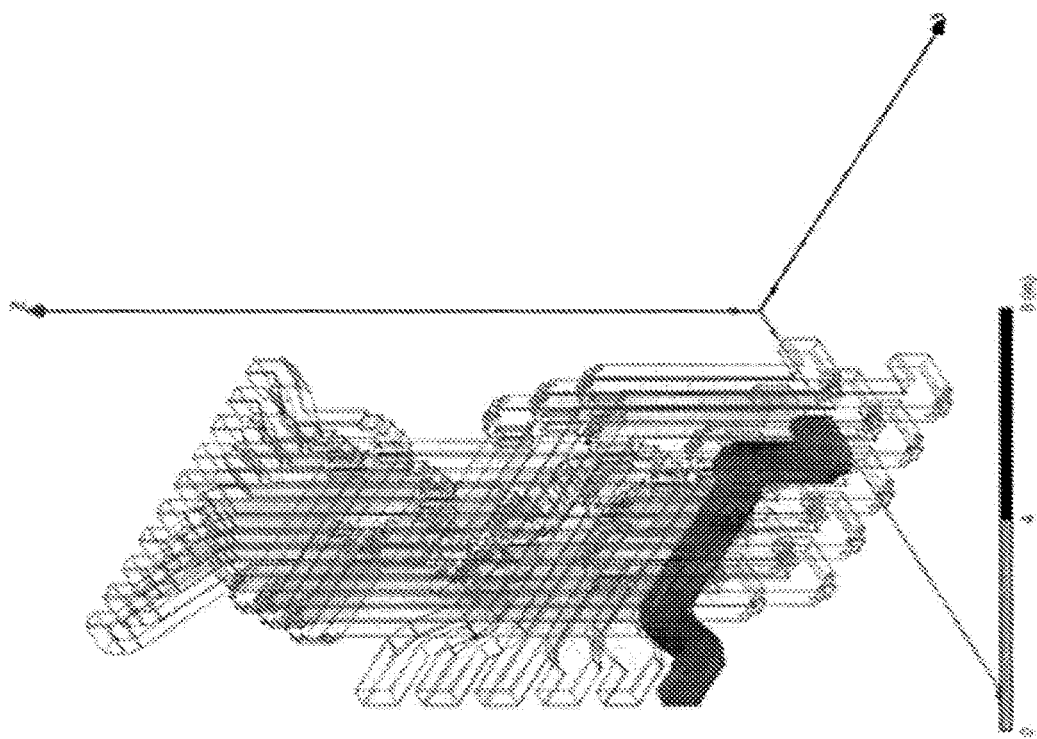
Figure 11M:
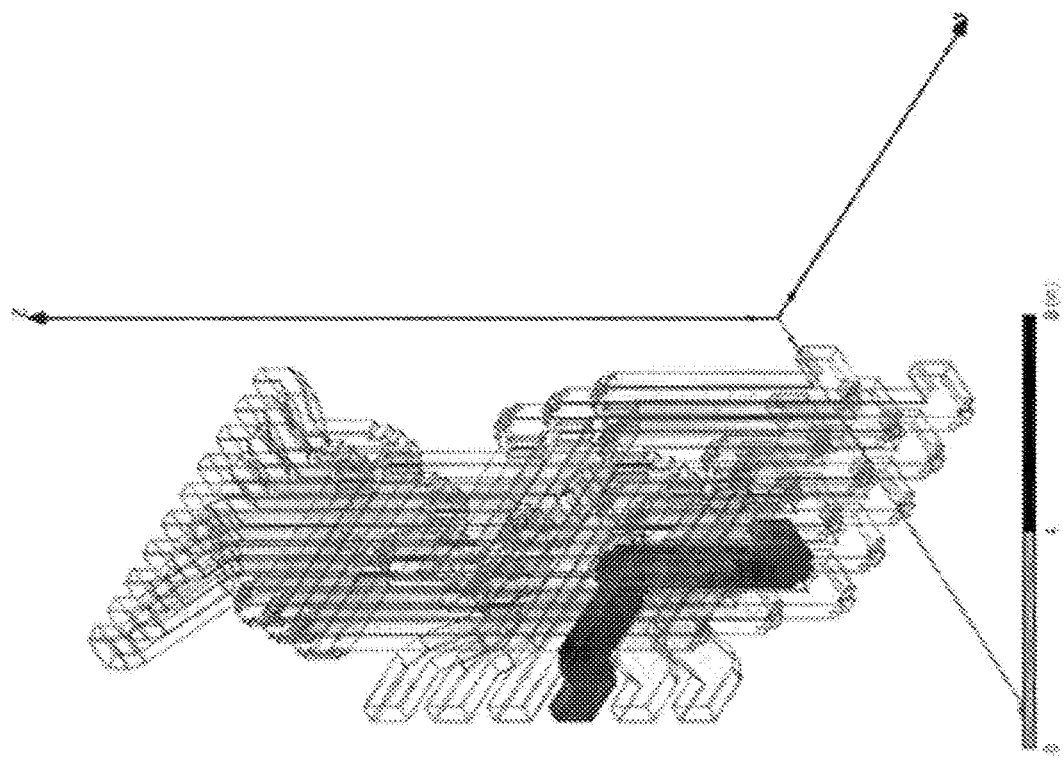
Figure 11N:
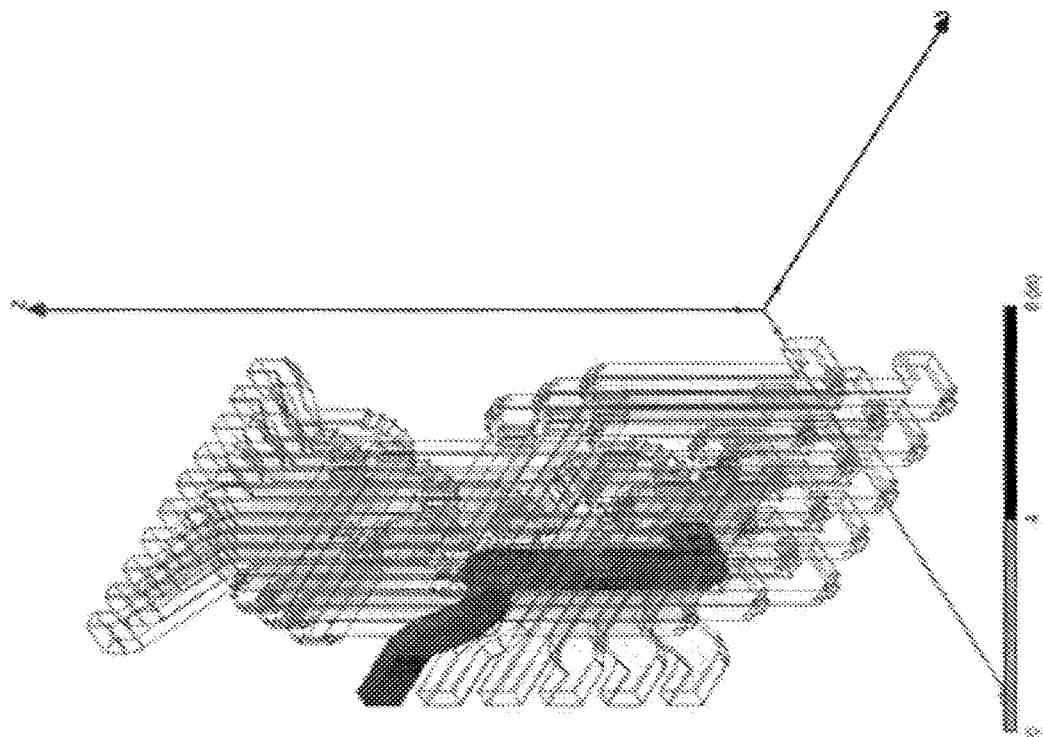

FIGS. 11A-11N depict the individual RF paths of the waveguide network device depicted in FIG. 3. FIGS. 11A-11N depict the waveguide network device with only two housings; however, as analyzed above, the number of housings may vary (e.g. more than two housings). Here in FIG. 11A, a second housing is attached to a first housing in a manner such that the waveguide channels of the first housing and a second housing are orthogonal. This configuration may be created by a custom-designed ((e.g., using a High-Frequency Structure Simulator (HFSS) software)) double-90 degree bend 1101 in the RF path. This custom-designed bend 1101 enables the waveguide routes to be as compact as possible (e.g., shared walls are maintained) with minimal loss. Moreover, by having this custom-designed bend (e.g., double-90 degree bend) 1101, all the RF paths are orientated either in the vertical (e.g., top or down) or horizontal (e.g., left or right) direction. As an example, the bent portions in the second housing are configured such that signals that navigate through the waveguide channels will not bounce backwards or in a different direction than the direction the path is designed for. In other words, the second housing may be preconfigured in a certain shape, size, and/or angle so that signals do not deviate from their paths. The remaining FIGS. 11B-11N illustrate the other individual RF paths being routed through the waveguide network device.

FIG. 12 illustrates a flowchart 1200 of an example process for creating and utilizing a waveguide network device in a satellite system. Referring to blocks 1201-1202, a determination of input channels and output channels is made. The signal paths and design specifications for the housings are first determined before the creation of a waveguide network device. Now referring to block 1204, once the determination has been made, the internal geometry of device to match input and output channels of the device is designed.

In block, 1206, a waveguide network device is then generated or manufactured. The waveguide network device can be manufactured by printing 1208, machining 1210, and/or other manufacturing processes 1212. For conventionally machined housings, the attachment between the housings can be vacuum brazing 1214, welding 1216, or via some other processes 1218 known in the art.

Referring to block 1220, once the waveguide network device is manufactured, the device is then configured to be integrated in a satellite system (e.g., spacecraft). In block 1222, the waveguide network device, when implemented in the satellite device, may receive RF signals from an input port of the one or more waveguide channels in one of at least two housings.

Referring to block 1224, the waveguide network device is then configured to output the signal in the desired configuration.

Figure 13:
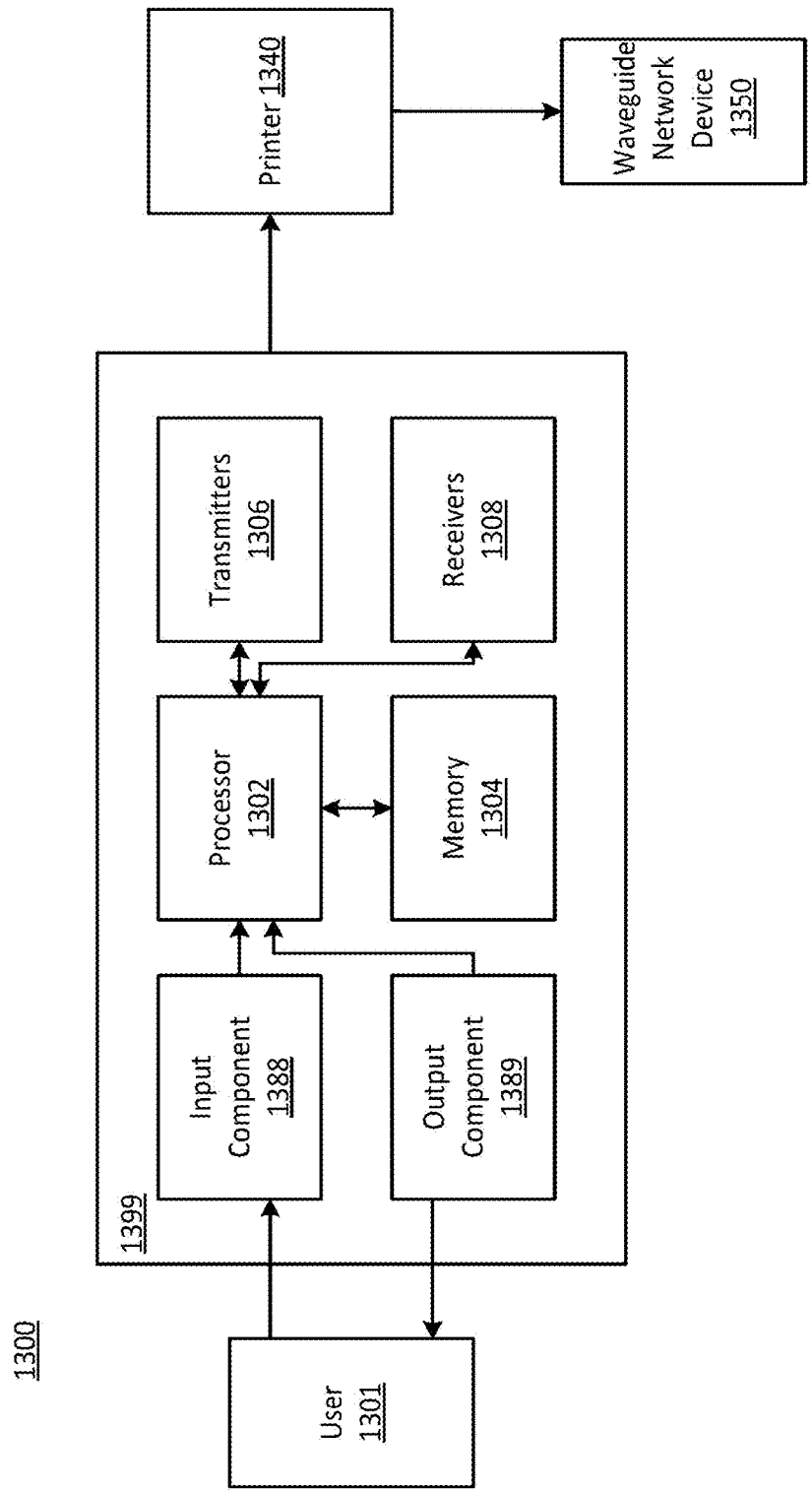
FIG. 13 illustrates an example schematic diagram of a system with a computing device configured to manufacture the waveguide network device of FIG. 3.

FIG. 13 is an example schematic diagram 1300 of a computing device 1399 that may be used to direct the manufacture of a waveguide network device 1350. As described above, the computing device 1399 is connected to a printer 1340, which is connected to provide design aspects or design specifications of the device. In one example, the printer is a three-dimensional (3-D) printer. The design specifications are configured to direct the printer 1340 to manufacture the waveguide network device 1350. In one example, the computing device 1399 may include a processor 1302, a memory device 1304 coupled to processor 1302, one or more wireless transmitters 1306, one or more wireless receivers 1308.

The computing device 1399 may also include at least one output component 1389 for presenting information to a user 1301 and a printer 1340. Output component 1389 may be any component capable of conveying information to user 1301 and printer 1340. In some implementations, output component 1389 includes an output adapter, such as a video adapter and/or an audio adapter or the like. An output adapter is operatively coupled to processor 1302 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 1389.

The computing device 1399 may also include at least one input component 1388 for receiving input from user 1301. Input component 1388 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 1389 and input component 1388. In some implementations, output component 1389 and/or input component 1388 include an adapter for communicating data and/or instructions between the node and a computer connected thereto.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used in the description of the disclosure and the appended claims, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof. Furthermore, the terms "assets" and "computing devices," when used in this specification, may be used interchangeably.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed example examples.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A device for directing waveguide routes, the device comprising:
   at least two housings attached together, the at least two housings comprising:
      a first housing including one or more first housing waveguide channels, wherein each of the one or more first housing waveguide channels includes a first housing input port and a first housing output port; and a second housing configured to attach to the first housing, wherein the second housing includes one or more second housing waveguide channels, wherein each of the one or more second housing waveguide channels includes a second housing input port and a second housing output port; and a sheet, disposed between the first housing and the second housing, the sheet being of a thickness less than any dimension of any of the one or more first housing waveguide channels and one or more second housing waveguide channels;

wherein the second housing is configured to receive a signal from the first housing input port of the one or more first housing waveguide channels;

wherein the second housing is configured to redirect the signal to the second housing output port via a first aperture in the sheet or the first housing output port via the first aperture in the sheet and a second aperture in the sheet; and wherein a number of waveguide channels in the second housing is different than a number of waveguide channels in the first housing.

2. The device of claim 1, wherein the first housing and second housing are vacuum brazed together with the sheet disposed therebetween to form the device.

3. The device of claim 1, wherein the device is located inside of a payload cavity of a satellite system at an antenna-payload interface.

4. The device of claim 1, wherein the signal includes a radio frequency (RF) signal.

5. The device of claim 1, wherein the device is configured to be manufactured by a printer.

6. The device of claim 5, wherein the printer is a three-dimensional (3-D) printer.

7. The device of claim 1, wherein:
the first housing output port or the second housing output port to which the signal is redirected is predetermined; and
the second housing and the first housing are attached using a double 90 degree bend.

8. A device for directing waveguide routes, the device comprising:
a first housing having one or more first housing waveguide channels and a second housing having one or more second housing waveguide channels;
the device configured to:
receive, from an input port of the one or more first housing waveguide channels in the first housing, a signal;
redirect the signal to a predetermined output port of one of the one or more first housing waveguide channels and the one or more second housing waveguide channels via one or more apertures of a sheet being of a thickness less than any dimension of the one or more first housing waveguide channels and the one or more second housing waveguide channels, wherein:
the first housing and second housing are configured to attach to each other with the sheet disposed therebetween;
a number of the one or more first housing waveguide channels is less than a number of the one or more second housing waveguide channels.

9. The device of claim 8, wherein the first housing and the second housing are configured to be attached using a double 90 degree bend.

10. The device of claim 8, wherein the first housing and the second housing are vacuum brazed together to attach and form a single device.

11. The device of claim 10, wherein the device is located inside of a payload cavity of a satellite system at an antenna-payload interface.

12. The device of claim 8, wherein the device is further configured to be manufactured by a three-dimensional (3-D) printer.

13. The device of claim 8, wherein the signal includes a radio frequency (RF) signal.

14. A method comprising:
forming a first housing including one or more first housing waveguide channels, wherein each of the one or more first housing waveguide channels in the first housing includes a first input port and a first output port,
forming a second housing including one or more second housing waveguide channels, wherein each of the one or more second housing waveguide channels in the second housing includes a second input port and a second output port; and
determining a device output port for a signal from the one or more first output ports or the one or more second output ports; and
in response to the determination, attaching the first housing to the second housing with a sheet disposed therebetween to form a single device;
wherein the single device is configured to redirect the signal to the determined device output port via one or more apertures of the sheet;
wherein the sheet is of a thickness less than any dimension of any of the one or more waveguide channels of the first housing and the second housing; and
wherein a number of first housing waveguide channels is different than a number of second channel waveguide channels.

15. The method of claim 14, wherein the first housing and the second housing are formed using a three-dimensional (3D) printer.

16. The method of claim 14, wherein the signal includes a radio frequency (RF) signal.

17. The method of claim 14, wherein attaching the first housing and the second housing includes vacuum brazing together the first housing and the second housing to form the single device.

18. The method of claim 14, wherein the single device is located inside of a payload cavity of a satellite system at an antenna-payload interface.

19. The method of claim 14, further comprising installing the single device in a satellite.

20. The method of claim 14, wherein the second housing and the first housing are attached using a double 90 degree bend.

* * * * *